(12) United States Patent
Evert et al.

(10) Patent No.: US 6,349,709 B1
(45) Date of Patent: Feb. 26, 2002

(54) VALVE APPARATUS AND METHOD FOR INJECTING NITROUS OXIDE INTO A COMBUSTION ENGINE

(75) Inventors: Joseph G. Evert, Fontana; Terry J. O'Connor, Orange, both of CA (US)

(73) Assignee: Terry Jay O'Connor, Orange, CA (US)

( * ) Notice: Subject to any disclaimer, the term of this patent is extended or adjusted under 35 U.S.C. 154(b) by 0 days.

(21) Appl. No.: 09/575,909

(22) Filed: May 23, 2000

(51) Int. Cl.[7] ................................................. F02B 23/00
(52) U.S. Cl. ....................... 123/585; 123/1 A; 239/581; 251/310
(58) Field of Search ................................. 123/585, 586, 123/1 A; 239/581.1; 251/129.11, 310

(56) References Cited

U.S. PATENT DOCUMENTS

| | | | |
|---|---|---|---|
| 4,971,586 A | * | 11/1990 | Walsh ......................... 440/88 |
| 5,950,664 A | * | 9/1999 | Battaglia .................... 137/375 |

OTHER PUBLICATIONS

Dan Barnes, "We Test Python's VCN–2000 Nitrous System" Sport Compact Car/Sep. 2000, pp. 258–262.
Dan Barnes, "Python Injection VCN–2000 VENOM Nitrous System", European Car/Oct. 2000, vol. 31, No. 18, pp. 118–121.
Jonathan Wong, "Chect Out Who's Got a New Handle on Nitrous", Super Street/Jul. 2000, pp. 152—155.

* cited by examiner

Primary Examiner—Tony M. Argenbright
Assistant Examiner—Katrina B. Harris
(74) Attorney, Agent, or Firm—Stetina Brunda Garred & Brucker

(57) ABSTRACT

An improved injection valve apparatus for variably controlling the injection of nitrous oxide and supplemental fuel into a combustion engine, and method for controlling and varying the amounts of nitrous oxide and supplemental fuel injected into a combustion engine based on existing engine conditions. The method programs engine parameters for the timing and volume of nitrous oxide injected into an engine, continuously monitors engine performance and engine conditions, and adjusts the amount of nitrous oxide injected and additional fuel supplied in response to changing engine conditions.

5 Claims, 2 Drawing Sheets

VALVE APPARATUS AND METHOD FOR INJECTING NITROUS OXIDE INTO A COMBUSTION ENGINE

CROSS-REFERENCE TO RELATED APPLICATIONS (Not applicable)

1. Field of the Invention

The present invention relates generally to systems for the injection of nitrous oxide into internal combustion engines, and is more particularly directed to a device and method for adjustably controlling the injection of nitrous oxide and supplemental fuel into such engines.

2. Background of the Invention

The output of an internal combustion engine is directly related to the density of air-fuel charge present when the combustion process takes place. As the density of the air-fuel charge increases, the horsepower and torque output increase as well. Some common methods used to increase the density of the air-fuel charge are to force air into the combustion chamber under pressure by the use of a turbocharger or supercharger.

Another method used is the introduction of nitrous oxide into the combustion chamber. Although nitrous oxide gas is non-flammable at room temperatures, when it super heats in the combustion chamber the nitrogen and oxygen molecules separate and make the oxygen available for the combustion process. Since air is only 21% oxygen by volume, the nitrous oxide gas provides a denser air charge within the engine. When additional fuel is added to this denser air charge, the power and torque output of the engine are increased. The amount of increase is proportional to the amount of nitrous oxide and fuel added to the engine. However, the maximum horsepower is ultimately limited by the mechanical limits of the engine.

Most conventional nitrous systems consist of: (1) a nitrous bottle; (2) a fuel control solenoid; (3) a nitrous oxide control solenoid; (4) a throttle switch; (5) a solenoid relay; and (6) flow control orifices. These systems are set up to activate the fuel and nitrous oxide control solenoids when the throttle reaches wide open. This is accomplished by the use of a switch mounted on the throttle body. When the solenoids are activated, nitrous oxide under high pressure enters the intake manifold or air stream of the engine. Simultaneously, the fuel solenoid is activated and fuel enters the intake manifold.

Some systems have an injection nozzle designed to mix the nitrous oxide and fuel together as they enter the intake manifold. The mixture is then ingested into the engine providing a much denser air-fuel mixture. The air-fuel mixture on conventional systems is determined by the orifice size in the fuel and nitrous oxide lines. The relationship between the fuel and nitrous orifice sizes must be refined until the proper air-fuel mixture is obtained. This process is time consuming and presents the possibility of engine damage during the tuning process if the air-fuel mixture becomes too lean. When there is too much nitrous oxide the air-fuel mixture becomes too lean and detonation can occur causing severe engine damage as the result of excessive combustion temperatures. Another disadvantage is the inability of the system to compensate for low bottle pressures. As the bottle pressure decreases the air-fuel mixture becomes excessively rich. This is a result of a lack of nitrous oxide in relationship to fuel. At some point the output of the engine is degraded as a result of this low bottle pressure condition.

Thus, the greatest challenge of nitrous oxide introduction into a combustion engine is the difficulty in maintaining a proper air-fuel ratio. Traditionally, nitrous oxide has only been introduced into the engine at wide open throttle. This is done because maximum power output of the engine is desired at wide open throttle and this provides only one condition in which auxiliary fuel enrichment is necessary. Since the nitrous oxide and auxiliary fuel flow is provided by a pair of fixed orifices in the delivery line, the air-fuel ratio is set for only one operating condition—wide open throttle.

Although vehicle technology has advanced significantly over the recent years, there have been very few if any advancements in nitrous oxide injection systems. In fact, the addition of electronic fuel injection, onboard computer systems and the proliferation of system sensors have presented a challenge to companies offering nitrous oxide injection systems. Most of the available prior art systems still cater to vehicles that use carburetion as a method for fuel delivery. Companies offering nitrous oxide systems for more modern fuel-injected engines have found the only method to provide the necessary additional fuel is to increase the fuel pressure. This method of fuel enrichment applies abnormally high fuel pressure to the injectors, which can damage the injectors or cause fuel system leakage.

Accordingly, there is a substantial need in the art for improved devices and techniques to control the injection of nitrous oxide into engines that allow nitrous oxide to be injected at various throttle angles other than just wide open throttle; that eliminate the risk of engine damage; that do not cause inefficient burning of the air-fuel mixture associated with low bottle pressures, and that are adaptable to engines that use fuel injectors to deliver fuel to the engine.

SUMMARY OF INVENTION

The present invention specifically addresses and alleviates the above-mentioned deficiencies associated with the prior art. In this regard, the present invention comprises an improved injection valve apparatus for variably controlling the injection of nitrous oxide into a combustion engine, and methods for controlling and varying the amounts of nitrous oxide injected into a combustion engine based on existing vehicle performance conditions.

According to the preferred embodiment of the invention, a nitrous oxide injection apparatus is integrated into a vehicle's existing systems to supply engine performance data to a computer management module, which is used to facilitate the controlled injection of nitrous oxide in varying amounts in response to changing engine conditions. The computer management module controls all aspects of data collection, analysis, and injection of nitrous oxide and corresponding supplemental fuel into the engine.

The computer management module interfaces with a vehicle's existing systems through a wiring harness to receive engine performance data from the engine's throttle position sensor, oxygen sensor, and ignition coil. The computer management module uses this data to calculate the amount of nitrous oxide to be injected, when to begin such injection, and whether additional fuel needs to be injected into the engine in response to the additional nitrous oxide injected. The wiring harness also connects to an LCD display preferably mounted to the dashboard of the vehicle, to provide the driver with system status information such as engine rpm, injector pulse width, air-fuel mixture, and throttle angle. The valve apparatus used for nitrous oxide injection provides linear control of nitrous oxide injection at high pressures of over 1000 psi.

Another preferred embodiment of the present invention allows the user to program the management module's operation by selecting one of three operating modes, Linear, Drag or Timed mode. In drag mode, the system operates in the same way as conventional prior art nitrous oxide injection systems by delivering the programmed amount of nitrous oxide to the engine when the control module senses a wide open throttle angle. In linear mode, the user programs at what throttle angle to start introducing nitrous oxide. The control module then adds a proportionate amount of nitrous oxide in relation to the throttle angle; the higher the throttle angle, the greater the amount of nitrous oxide is supplied to the engine, up to the maximum amount the user has specified. This is expected to be the most popular mode of operation. In timed mode, the user programs at what throttle angle the nitrous oxide will be introduced and how much nitrous oxide will be added in terms of a percentage of valve orifice size. The user also enters a time delay or pause after the throttle angle is reached, and a nitrous oxide injection duration. This is ideal for turbo-charged engines because the nitrous oxide can be energized while the turbo reaches optimized boost levels and then deactivated after a certain amount of time. In all modes the user can program the maximum amount of nitrous that is introduced.

Other features and advantages of the invention will become apparent from the following detailed description, taken in conjunction with the accompanying drawings, which illustrate, by way of example, various features of embodiments of the invention.

BRIEF DESCRIPTION OF THE DRAWINGS

These, as well as other features of the present invention, will become more apparent upon reference to the accompanying drawings wherein like numerals designate corresponding parts in the several figures.

FIG. 2 is a cross-sectional view of the valve apparatus of FIG. 1; and.

DETAILED DESCRIPTION OF THE PREFERRED EMBODIMENTS

The following detailed description and accompanying drawings are provided for purposes of illustrating and describing presently preferred embodiments of the invention and are not intended to limit the scope of the invention in any way. It will be recognized that further embodiments of the invention may be used and are expressly contemplated herein.

Figure 1:
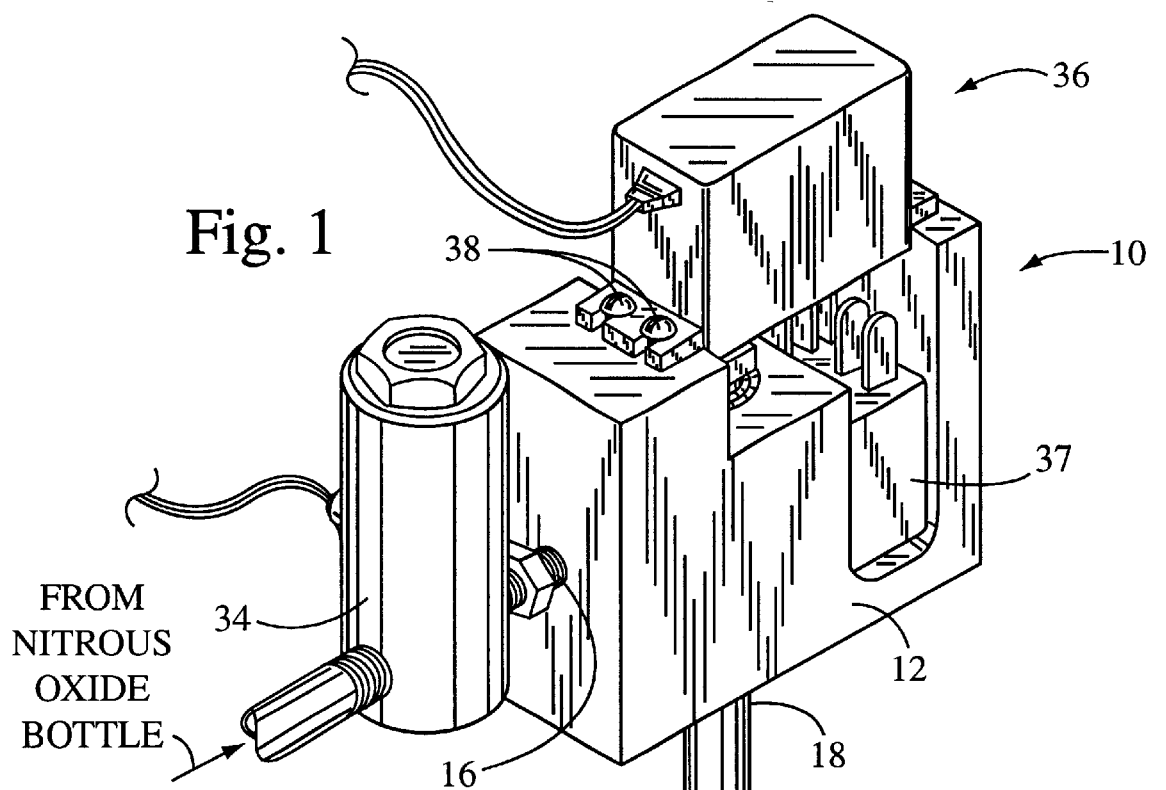
FIG. 1 is a perspective view of the valve apparatus of the present invention.
Figure 2:
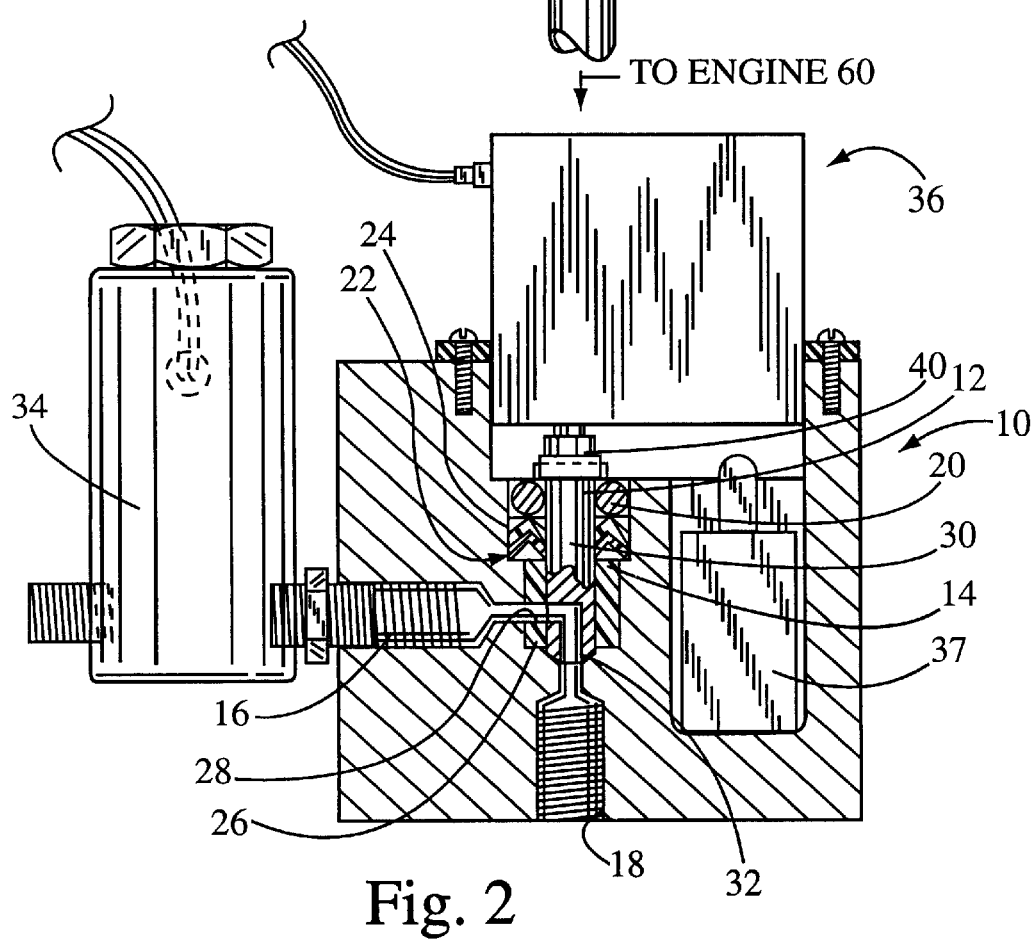

Referring now to the drawings, FIG. 1 is a perspective view of the nitrous oxide injection valve apparatus 10 of the present invention for adjustably controlling the high-pressure injection of nitrous oxide into the combustion chamber of an engine 60. As best shown in FIG. 2, the valve apparatus 10, includes a valve body 12, which has a variable diameter valve pin housing bore 14, an inlet 16, and an outlet 18, which are in alignment for the flow of nitrous oxide therethrough. The variable diameter valve pin housing bore 14, is defined by a number of stepped diameter portions which receive in a stackable alignment a cylindrical bushing 26, the lower and upper ring seals 24 and 22 respectively, the sealed roller bearing 20, and the valve pin 30. The valve pin 30 is provided with an internal flow orifice or passageway 32 which extends radially inward from it's outside diameter and then axially downward terminating at the distal end of the valve pin 30. The cylindrical bushing 26, the lower and upper ring seals 24 and 22 respectively, and the sealed roller bearing 20, are seated within the variable diameter valve pin housing bore 14, such that a radially extending void or opening 28 formed in the bushing 26, is permanently axially aligned with the inlet 16. The valve pin 30 is axially positioned such that the valve pin passage 32 is rotatable between a closed position and an open position. In the open position, the valve pin passage 32 is co-axially aligned with the opening 28 and inlet 16, to allow full flow of nitrous oxide from the inlet 16, through the valve pin passage 32, to the outlet 18. In the closed position, the valve pin passage or orifice is misaligned with the opening 28 and inlet 16 to block flow through the valve. At radial positions between the fully open and closed positions, a variable size of the orifice 32 is aligned with the inlet 16 to vary the flow of nitrous through the valve.

The upper end of the valve pin 12 is attached to a rotating means to selectively rotate the valve pin between it's fully opened and closed position. The rotating means 36, preferably comprises a servo motor with a servo output shaft 40, which is rotatably coupled to the valve pin 30, to rotate the valve pin between it's closed and open positions. Attached to the inlet 16, of the valve body 12, is a high pressure on-off control solenoid 34, which allows nitrous oxide to be selectively supplied to the inlet 16, and the valve pin 30. The mounting means 38, for attaching the servo motor to the valve body 12, preferably comprise threaded holes in the valve body 12, for accepting conventional screws or other similar fasteners. The activation of the servo motor 36 and solenoid 34 is facilitated by a conventional relay 37 which is electrically connected to the servo motor 36 and solenoid 34 via a wiring harness (not shown).

Having thus described the structural attributes of the valve apparatus, the preferred methods of using the same in nitrous oxide injection methods will now be discussed with reference to FIG. 3, which comprises a schematic block diagram showing how the valve apparatus 10, control module 52, and wiring harness 54, are connected to and interrelate with a vehicle's existing systems.

Figure 3:
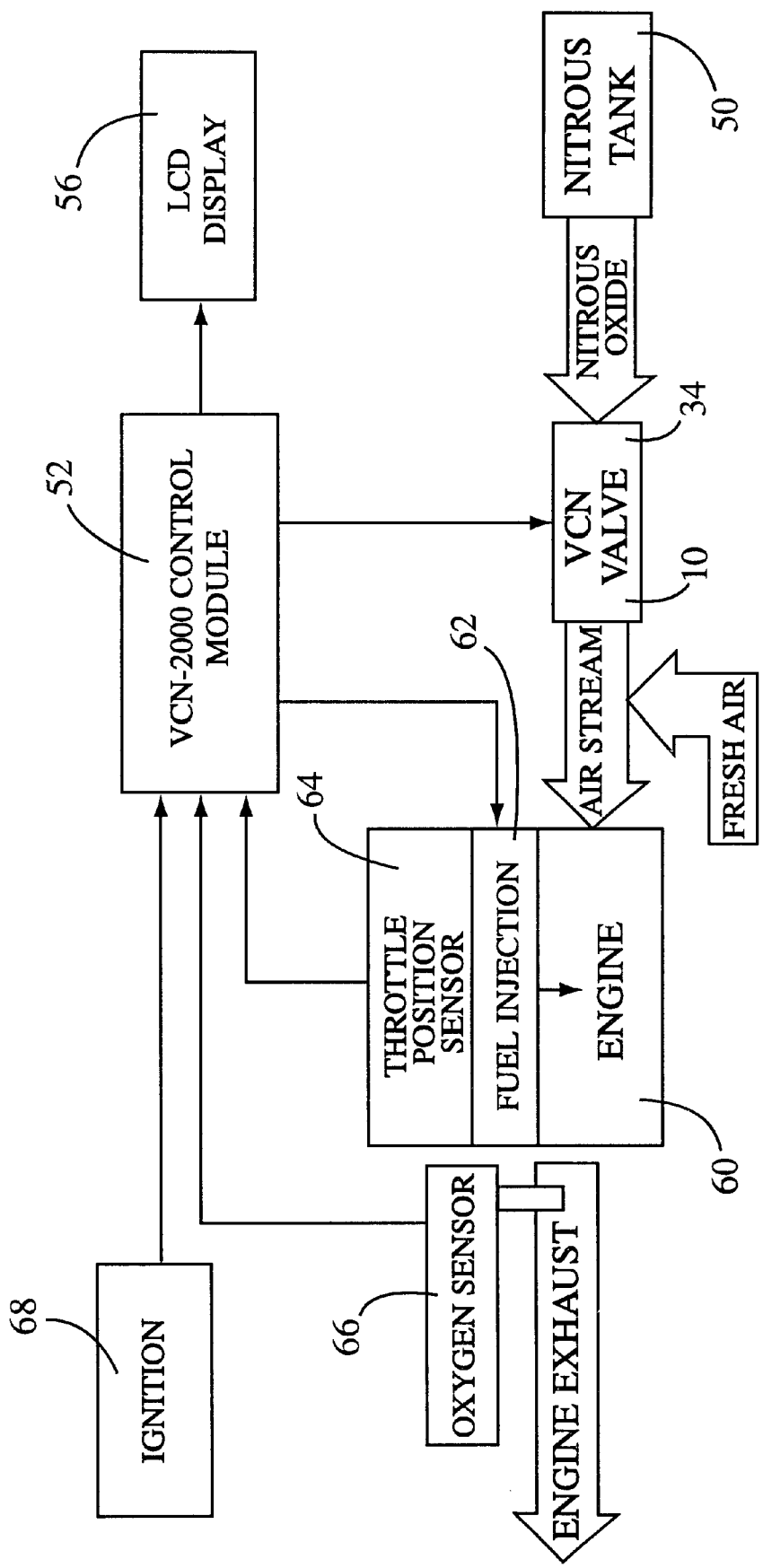
FIG. 3 is a schematic diagram showing how the valve apparatus and control module of the present invention relate to a vehicle's existing systems.

Referring now to FIG. 3, the nitrous oxide injection system includes a conventional programmable electrical control module 52, that is programmed to control all aspects of system operations, including nitrous oxide injection and fuel supplementation. The control module 52, receives existing vehicle performance data signals from existing vehicle systems through a conventional wiring harness (not shown), which connects to the control module 52, the existing throttle position sensor 64, the oxygen sensor 66, the ignition coil 68, and the fuel injectors 62.

The control module 52, receives engine rpm data from the existing ignition coil 68, to determine when to begin injecting nitrous oxide. The control module 52, receives engine throttle angle data from the existing throttle position sensor 64, to calculate the rate of nitrous oxide injection. The control module 52, receives the air-fuel mixture of the engine 60, by monitoring the oxygen content of the exhaust from the existing oxygen sensor 66, to maintain the proper air-fuel ratio.

The control module 52, is connected to the valve apparatus 10, to variably and preferably linearly control nitrous oxide flow into the engine 60. The valve apparatus 10, is supplied with nitrous oxide by the solenoid 34, from an attached nitrous oxide tank 50. The control module 52, is connected to a dash-mounted LCD display 56, to provide the driver with system status information, including engine rpm, injector pulse width, air-fuel mixture, and throttle angle.

As nitrous oxide is injected into the engine 60, the air-fuel ratio can become lean, due to excess air from the nitrous oxide injection. When this occurs, the control module 52 senses the condition via the oxygen sensor 66, and adds the appropriate amount of fuel by electronically pulsing the existing fuel injectors 62. The control module 52, provides additional fuel only in the event the air-fuel mixture becomes lean. This method eliminates the problem of over-enrichment at low bottle pressures associated with conventional systems, and ensures the air-fuel mixture is ideal for any engine condition or nitrous oxide level. Furthermore, because the system provides fuel enrichment by controlling the existing fuel injectors 62, the need for additional fuel solenoids, as with conventional systems, is eliminated.

Because the system is programmably controlled by the control module 52, the user can select various programmed modes of operation, such as Linear, Drag or Timed mode. In drag mode, the system operates in the same way as conventional nitrous oxide injection systems by delivering the programmed amount of nitrous oxide to the engine 60, when the control module 52, senses wide open throttle. In linear mode, the user programs at what throttle angle to start introducing nitrous oxide. The control module 52, then adds a proportionate amount of nitrous oxide in relation to the throttle angle; the higher the throttle angle, the greater the amount of nitrous oxide introduced into the engine 60, up to the maximum amount the user has specified. In timed mode, the user programs at what throttle angle the nitrous oxide will be introduced, and how much nitrous oxide will be added in terms of a percentage of effective valve pin orifice size aligned with the inlet 16. The user may also program a time delay after the throttle angle is reached, and a nitrous oxide injection duration. The control module 52, can introduce nitrous gradually as the throttle opens to a maximum amount specified by the user. This is ideal for turbo-charged engines. The nitrous oxide can be energized while the turbo reaches optimized boost levels then is deactivated after a certain amount of time. In all modes the user can program the maximum amount of nitrous that is introduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive; the scope of the invention being indicated by the appended claims, rather than the foregoing description, and all changes which come within the meaning and range of equivalency of the claims are therefore intended to be embraced therein.

What is claimed is:

1. A valve apparatus for adjustably controlling the high-pressure flow of nitrous oxide into an engine, comprising:

a valve body having an inlet, an outlet, and a step diameter valve pin housing bore;

a valve pin rotatably and sealingly mounted in the valve pin housing bore and having a passage in said valve pin to allow the high pressure flow of nitrous oxide from the inlet to the outlet when the valve pin is rotated from a closed position to an open position;

rotating means coupled to the valve pin assembly to rotate the valve pin between the closed position to the open position; and a solenoid coupled to the inlet to allow nitrous oxide to be supplied to the inlet of the valve apparatus.

2. The valve apparatus of claim 1 further comprising a hollow cylindrical bushing seated in the valve pin housing bore with the valve pin axially inserted into the hollow portion, said bushing having a void radially extending from the hollow center and positioned in alignment with the inlet.

3. The valve apparatus of claim 1 or 2 further comprising a sealed roller bearing seated in the valve pin housing bore with the valve pin axially inserted therein.

4. The valve apparatus of claim 1, further comprising at least one ring seal seated in the valve pin housing bore with the valve pin axially inserted therein.

5. A valve apparatus applied to adjustabdly control a high-pressure injection of nitrous oxide into a combustion chamber of an engine, comprising:

a valve body having an inlet, an outlet, and a valve pin housing bore of which a diameter is variable;

a valve pin rotatably and sealingly mounted in the valve on housing bore and having a passage in said valve pin to allow a direct entrance of the high-pressure flow of nitrous oxide from the inlet to the passage, and then to the outlet when the valve pin is rotated from a closed position to an open position;

rotating means coupled to the valve pin assembly to rotate the valve pin between the closed position to the open position; and a solenoid coupled to the inlet o allow nitrous oxide to be supplied to the inlet of the valve apparatus.

* * * * *